United States Patent Office 3,140,252
Patented July 7, 1964

3,140,252
HYDROCARBON CONVERSION WITH CRYSTALLINE ACID-METAL ALUMINOSILICATES
Vincent J. Frilette, Cherry Hill, N.J., and Paul B. Weisz, Media, Pa., assignors to Socony Mobil Oil Company, Inc., a corporation of New York
No Drawing. Original application Dec. 21, 1961, Ser. No. 161,242. Divided and this application Feb. 10, 1964, Ser. No. 343,489
9 Claims. (Cl. 208—120)

This invention relates to catalyst compositions and more particularly to aluminosilicate catalysts containing hydrogen ions and metal cations, and their method of preparation. This application is a division of Ser. No. 161,242, filed December 21, 1961.

A considerable number of materials have heretofore been proposed as catalysts for the conversion of hydrocarbons into one or more desired products. In the catalytic cracking of hydrocarbon oils, for example, wherein hydrocarbon oils of higher boiling range are converted into hydrocarbons of lower boiling range, notably hydrocarbons boiling in the motor fuel range, the catalysts most widely used are solid materials which behave in an acidic manner whereby hydrocarbons are cracked. Although acidic catalysts of this type possess one or more desired characteristics, a great many of these catalysts have undesirable characteristics, such as lack of thermal stability, availability, or mechanical strength, etc., whereby a wide range of suitable properties cannot be maintained. Synthetic silica-alumina composites, the most popular catalysts known to have been proposed heretofore, provide limited yields of gasoline for a given yield of coke and further suffer the disadvantage of rapidly deteriorating and becoming inactive in the presence of steam, particularly at temperatures above 1000° F. Other catalysts less widely used include those materials of an argillaceous nature, e.g., bentonite and montmorillonite, which have been treated with acid to bring out their latent cracking characteristics. Catalysts of this general type are relatively inexpensive, but are only moderately active and exhibit a decline in activity over periods of many conversion and regeneration cycles. Some synthetic materials, such as silica-magnesia complexes, are more active than conventional silica-alumina catalysts and undergo normal aging, but have limited utility because of their poor product distribution as evidenced, for example, by low octane number of the gasoline.

Other disadvantages of heretofore proposed catalysts include poor activity, chemical stability and product distribution in obtaining desired yields of useful products.

The present invention is based on the discovery that aluminosilicates containing from 0.5 to 1.0 equivalent of certain ions of positive valence per gram atom of aluminum are highly active hydrocarbon conversion catalysts. The ions of positive valence contained in the aluminosilicates of this invention consist of from 0.01 to 0.99 equivalent of hydrogen ion per gram atom of aluminum and from 0.99 to 0.01 equivalent per gram atom of aluminum of cations of metals selected from Groups IB through VIII of the Periodic Table. The catalysts of this invention possess a wide spectrum in magnitude of catalytic activity; can be used in relatively small concentrations; and permit certain hydro-carbon conversion processes to be carried out under practicable and controllable rates at lower temperatures, than those previously employed. In the catalytic cracking of hydrocarbon oils into hydrocarbon products of lower molecular weight, the reaction rates per unit volume of catalyst that are obtainable by the catalysts of the invention vary up to many thousand times the rates achieved with the best siliceous catalysts heretofore proposed. The present invention furthermore provides a means whereby aluminosilicate materials having no internally available surfaces and only external particle surface areas can be readily converted to useful catalysts which thus broadens considerably their realm of practical utility.

The high activity catalysts contemplated herein are aluminosilicate compositions which are strongly acidic in character as a result of treatment with a fluid medium containing at least one metallic cation and a hydrogen ion or ion capable of conversion to a hydrogen ion. Inorganic and organic acids broadly represent the source of hydrogen ions; metallic salts the source of metal cations; and ammonium compounds the source of cations capable of conversion to hydrogen ions. The product resulting from treatment with the fluid medium is an activated crystalline and/or amorphous aluminosilicate in which the nuclear structure thereof has been modified solely to the extent of having protons and metallic cations chemisorbed or ionically bonded thereto. The activated aluminosilicate contains at least 0.5 equivalent and preferably contains more than 0.9 equivalent of ions of positive valence per gram atom of aluminum. Except for alkali metal cations which may be present as impurities to the extent of less than 0.25 equivalent per gram atom of aluminum, no other cations of metals of Group IA of the Periodic Table are associated with the aluminosilicate. When subsequently dried, washed and further used as an intermediate, this product has been found to be extremely active as a catalyst for hydrocarbon conversion.

In preparing the catalyst composition, the aluminosilicate can be contacted with a non-aqueous or aqueous fluid medium comprising a gas, polar solvent or water solution containing the desired hydrogen ion or ammonium ion capable of conversion to a hydrogen ion and at least one metallic salt soluble in the fluid medium. Alternatively, the aluminosilicate can be first contacted with a fluid medium containing a hydrogen ion or ammonium ion capable of conversion to a hydrogen ion and then with a fluid medium containing at least one metallic salt. Similarly, the aluminosilicate can be first contacted with a fluid medium containing at least one metallic salt and then with a fluid medium containing a hydrogen ion or an ion capable of conversion to a hydrogen ion or a mixture of both. Water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and metallic salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

The hydrogen ion or ammonium ion may be present in the fluid medium in an amount varying within wide limits dependent upon the pH value of the fluid medium. Where the aluminosilicate material has a molar ratio of silica to alumina greater than about 5.0, the fluid medium may contain a hydrogen ion, metal cation, ammonium ion, or a mixture thereof, equivalent to a pH value ranging from less than 1.0 up to a pH value of about 12.0. Within these limits, pH values for fluid media containing a metallic cation and/or an ammonium ion range from 4.0 to 10.0, and are preferably between a pH value of 4.5 to 8.5. For fluid media containing a hydrogen ion alone or with a metallic cation, the pH values range from less than 1.0 up to about 7.0, and are preferably within the range of less than 1.0 up to 4.5. Where the molar ratio of the aluminosilicate is greater than about 2.2 and less than about 5.0, the pH value for the fluid media containing a hydrogen ion or a metal cation ranges from 3.8 to 8.5. Where ammonium ions are employed, either alone or in combination with metallic cations, the pH value ranges from 4.5 to 9.5 and is preferably within the limit of 4.5 to 8.5. When the aluminosilicate material has a molar ratio of silica to alumina less than about 3.0, the preferred medium is a fluid medium containing an ammonium ion instead of a hydrogen ion. Thus, depending upon the silica to alumina ratio, the pH value varies within rather wide limits. In such instances, where the fluid medium contains an acid and is unfavorable to the molecular structure of the aluminosilicate, fluid medium may consist, for example, of a vaporized ammonium compound such as ammonium chloride, or an aqueous or non-aqueous medium containing the same. In this manner, aluminosilicates otherwise unsuitable for treatment with an acid-containing fluid medium are readily activated to provide useful catalyst compositions.

In carrying out the treatment with the fluid medium, the procedure employed comprises contacting the aluminosilicate with the desired fluid medium or media until such time as metallic cations originally present in the aluminosilicate are virtually exhausted. Cations of metals of Group IA of the Periodic Table, if present in the modified aluminosilicate, tend to suppress or limit catalytic properties, the activity of which, as a general rule, decreases with increasing content of these metallic cations. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment, as well as determination of and correction for anions that pass into the effluent wash from soluble substances or decomposition products of insoluble substances which are otherwise present in the aluminosilicate as impurities.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or varporization temperature of the acid or ammonium compound is below the decomposition temperature of the aluminosilicate.

A wide variety of acidic compounds can be employed with facility as a source of hydrogen ions and include both inorganic and organic acids.

Representative inorganic acids which can be employed include acids such as hydrochloric acid, hypochlorous acid, chloroplantinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NHS_3H$), amidodisulfonic acid $$(NH(SO_3H)_2)$$

chlorosulfuric acid, thiocyanic acid( hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$), hydroxylamine disulfonic acid (($HSO_3)_2NOH$), nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acids, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acide, undecylic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkyl-succinic acid, alkenylsuccinic acid, maleic acid, fumaric acid, itaconic acid, citraconic acid, measconic acid, glutonic acid, muconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxy-cinnamic acid, hydrocinnamic acid, pyrogallic acid, benzoic acid, ortho-, meta- and para-methyl, hydroxy, chloro, bromo and nitro-substituted benzoic acids, phenylacetic acid, mandeloric acid, benzylic acid, hippuric acid, benzenesulfonic acid, toluenesulfonic acid, methanesulfonic acid and the like.

Other sources of hydrogen ions include carboxy polyesters prepared by the reaction of an excess polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium hydroxide, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartrate and the like. Still other ammonium compounds which can be employed include tetraalkyl and tetraaryl ammonium salts such as tetramethylammonium hydroxide, trimethylammonium hydroxide. Other compounds which can be employed are nitrogen bases such as the salts of guanidine, pyridine, quinoline, etc.

A wide variety of metallic compounds can be employed with facility as a source of metallic cations and include both inorganic and organic salts of the metals of Group IB through Group VIII of the Periodic Table.

Representative of the salts which can be employed include chlorides, bromides, iodides, carbonates, bicarbonates sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitations on the particular metal salt or salts employed are that it be soluble in the fluid medium in which it is used and compatible with the hydrogen ion source, especially if both the metallic salt and the hydrogen ion source are in the same fluid medium. The preferred salts are the chlorides, nitrates, acetates and sulfates.

Of the wide variety of metallic salts which can be employed, the most preferred are salts of trivalent metals, then of divalent metals and lastly, of monovalent metals. Of the divalent metals, the preferred ones are of Group IIA of the Periodic Table. The particularly preferred salts are those of the rare earth metals including cerium, lanthanum, praseodymium, neodymium, illinium, samarmium, europium, gadolinium, terbium, dysprosium, holmium, erbium, thulium, ytterbium and lutecium.

The rare earth salts employed can either be the salt of a single metal or preferably, of mixtures of metals such as a rare earth chloride or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. The rare earth chloride solution is commercially available and it contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight and other rare earth oxides 0.8% by weight. Didymium chloride is also a mixture of rare earth chlorides, but having a low cerium content. It consists of the following rare earths determined as oxides: lanthanum, 45–46% by weight; cerium 1–2% by weight; praseodymium, 9–10% by weight; neodymium, 32–33% by weight; samarium, 5–6% by weight; gadolinium 3–4% by weight; yttrium 0.4% by weight; other rare earths 1–2% by weight. It is to be understood that other mixtures of rare earths are equally applicable in the instant invention.

Representative metal salts which can be employed, aside from the mixtures mentioned above, include silver chloride, silver sulfate, silver nitrate, silver acetate, silver arsenate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, magnesium chloride, magnesium bromide, magnesium sulfate, magnesium sulfide, magnesium acetate, magnesium formate, magnesium stearate, magnesium tartrate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide neodymium sulfate, praseodymium chloride, praseodymium bromide, praseodymium sulfate, praseodymium sulfide, etc.

The aluminosilicates treated in accordance with the invention include a wide variety of aluminosilicates, both natural and synthetic, which have an amorphous or preferably either a crystalline structure or a combination of crystalline and amorphous. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form the aluminosilicates may be represented by the formula:

$$\frac{M_2}{n}O:Al_2O_3:wSiO_2:yH_2O \qquad (I)$$

wherein M is a cation which balances the electrovalence of the tetrahedra, n represents the valence of the cation, w the moles of $SiO_2$, and y the moles of $H_2O$. The cation can be any or more of a number of metal ions depending on whether the aluminosilicate is synthesized or occurs naturally. Typical cations include sodium, lithium, potassium, silver, magnesium, calcium, zinc, barium, iron and manganese. Although the proportions of inorganic oxides in the silicates and their spatial arrangement may vary, effecting distinct properties in the aluminosilicates, the two main characteristics of these materials is the presence in their molecular structure of at least 0.5 equivalent of an ion of positive valence per gram atom of aluminum, and an ability to undergo dehydration without substantially affecting the $SiO_4$ and $AlO_4$ framework. In this respect, these characteristics are essential for obtaining catalyst compositions of high activity in accordance with the invention.

Representative materials include synthesized crystalline aluminosilicates, designated Zeolite X, which can be represented in terms of mole ratios of oxides as follows:

$$1.0\pm0.2\frac{M_2}{n}O:Al_2O_3:2.5\pm0.5SiO_2:yH_2O \qquad (II)$$

wherein M is a cation having a valence of not more than three, n represents the valence of M, and y is a value up to eight depending on the identity of M and degree of hydration of the crystal. The sodium form may be represented in terms of mole ratios of oxides as follows:

$$0.9Na_2O:Al_2O_3:2.5SiO_2:6.1H_2O \qquad (III)$$

Another synthesized crystalline aluminosilicate, designated Zeolite A, can be represented in mole ratios of oxides as:

$$1.0\pm0.2M_{\frac{2}{n}}O:Al_2O_3:1.85\pm0.5SiO_2:yH_2O \quad (IV)$$

wherein M represents a metal, n is the valence of M, and y is any value up to about 6. As prepared, Zeolite A contains primarily sodium cations and is designated sodium Zeolite A.

Other suitable synthesized crystalline aluminosilicates are those designated Zeolite Y, L and D.

The formula for Zeolite Y expressed in oxide mole ratios is:

$$0.9\pm0.2Na_2O:Al_2O_3:wSiO_2:yH_2O \quad (V)$$

wherein w is a value ranging from 3 to 6 and y may be any value up to about 9.

The composition of Zeolite L in oxide mole ratios may be represented as:

$$1.0\pm0.1M_{\frac{2}{n}}O:Al_2O_3:6.4\pm0.5SiO_2:yH_2O \quad (VI)$$

wherein M designates a metal, n represents the valence of M, and y is any value from 0 to 7.

The formula for Zeolite D, in terms of oxide mole ratios, may be represented as:

$$0.9\pm0.2[xNa_2O:(1-x)K_2O]:Al_2O_3:wSiO_2:yH_2O \quad (VII)$$

wherein x is a value of 0 to 1, w is from 4.5 to about 4.9, and y, in the fully hydrated form, is about 7.

Other synthetic crystalline aluminosilicates which can be used include those designated as Zeolite R, S, T, Z, E, F, Q and B.

The formula for Zeolite R in terms of oxide mole ratios may be written as follows:

$$0.9\pm0.2Na_2O:Al_2O_3:wSiO_2:yH_2O \quad (VIII)$$

wherein w is from 2.45 to 3.65, and y, in the hydrated form, is about 7.

The formula for Zeolite S in terms of oxide mole ratios may be written as:

$$0.9\pm0.2Na_2O:Al_2O_3:wSiO_2:yH_2O \quad (IX)$$

wherein w is from 4.6 to 5.9 and y, in the hydrated form, is about 6 to 7.

The formula for Zeolite T in terms of oxide mole ratios may be written as:

$$1.1\pm0.4xNa_2O:(1-x)K_2O:Al_2O_3:6.9\pm0.5SiO_2:yH_2O \quad (X)$$

wherein x is any value from about 0.1 to about 0.8, and y is any value from about 0 to about 8.

The formula for Zeolite Z in terms of oxide mole ratios may be written as:

$$K_2O:Al_2O_3:2SiO_2:yH_2O \quad (XI)$$

wherein y is any value not exceeding 3.

The formula for Zeolite E in terms of oxide mole ratios may be written as:

$$0.9\pm0.1M_{\frac{2}{n}}O:Al_2O_3:1.95\pm0.1SiO_2:yH_2O \quad (XII)$$

wherein M is a cation, n is the valence of the cation, and y is a value of 0 to 4.

The formula for Zeolite F in terms of oxide mole ratios may be written as:

$$0.95\pm0.15M_{\frac{2}{n}}O:Al_2O_3:2.05\pm0.3SiO_2:yH_2O \quad (XIII)$$

wherein M is a cation, n is the valence of the cation, and y is any value from 0 to about 3.

The formula for Zeolite O, expressed in terms of oxide mole ratios may be written as:

$$0.95\pm0.05M_{\frac{2}{n}}O:Al_2O_3:2.2\pm0.05SiO_2:yH_2O \quad (XIV)$$

wherein M is a cation, n is the valence of the cation, and y is any value from 0 to 5.

The formula for Zeolite B may be written in terms of oxide mole ratios as:

$$1.0\pm0.2M_{\frac{2}{n}}O:Al_2O_3:3.5\pm1.5SiO_2:yH_2O \quad (XV)$$

wherein M represents a cation, n is the valence of the cation, and y has an average value of 5.1 but may range from 0 to 6.

Other synthesized crystalline aluminosilicates include those designated as ZK–4 and ZK–5.

ZK–4 can be represented in terms of mole ratios of oxides as:

$$0.1 \text{ to } 0.3R:0.7 \text{ to } 1.0M_{\frac{2}{n}}O:Al_2O_3:2.5 \text{ to } 4.0SiO_2:yH_2O \quad (XVI)$$

wherein R is a member selected from the group consisting of methylammonium oxide, hydrogen and mixtures thereof with one another, M is a metal cation, and y is any value from about 3.5 to about 5.5. As synthesized, Zeolite ZK–4 contains primarily sodium cations and can be represented by unit cell formula:

$$Na_{7.5}\pm_2H_2\pm_{0.5}9\pm2AlO_2:15\pm2SiO_2$$

The major lines of the X-ray diffraction pattern of ZK–4 are set forth in the table below:

TABLE

| d Value of Reflection in A | 100 I/I0 |
|---|---|
| 12.00 | 100 |
| 9.12 | 29 |
| 8.578 | 73 |
| 7.035 | 52 |
| 6.358 | 15 |
| 5.426 | 23 |
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK–4 can be prepared by preparing an aqueous solution of oxides containing as $Na_2O$, $Al_2O_3$, $SiO_2$, $H_2O$ and tetramethylammonium ion having a composition, in terms of oxide mole ratios, which falls within the following ranges:

$SiO_2/Al_2O_3$ ---------------------------------- 2.5 to 11

$\frac{Na_2O}{Na_2O+[(CH_3)_4N]_2O}$ ---------------- 0.05 to 0.25

$\frac{H_2O}{Na_2O+[(CH_3)_4N]_2O}$ ---------------- 25 to 50

$\frac{Na_2O+[(CH_3)_4N]_2O}{SiO_2}$ ---------------- 1 to 2 maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

ZK-5 is representative of another crystalline aluminosilicate which is prepared in the same manner as Zeolite ZK-4 except that N,N'-dimethyltriethylenediammonium hydroxide is used in place of tetramethylammonium hydroxide. ZK-5 may be prepared from an aqueous sodium aluminosilicate mixture having the following composition expressed in terms of oxide mole ratios as:

$$SiO_2/Al_2O_3 \quad \text{2.5 to 11}$$

$$\frac{Na_2O}{Na_2O+[(CH_2)_6N_2(CH_3)_2]OH} \quad \text{0.05 to 0.25}$$

$$\frac{H_2O}{Na_2O+[(CH_2)_6N_2(CH_3)_2]OH} \quad \text{25 to 50}$$

$$\frac{Na_2O+[(CH_2)_6N_2(CH_3)_2]OH}{SiO_2} \quad \text{1 to 2}$$

The N,N'-dimethyltriethylenediammonium hydroxide used in preparing ZK-5 can be prepared by methylating 1,4-diazobicyclo-(2.2.2)-octane with methyl iodide or dimethyl sulfate, followed by conversion to the hydroxide by treatment with silver oxide or barium hydroxide. The reaction may be illustrated as follows:

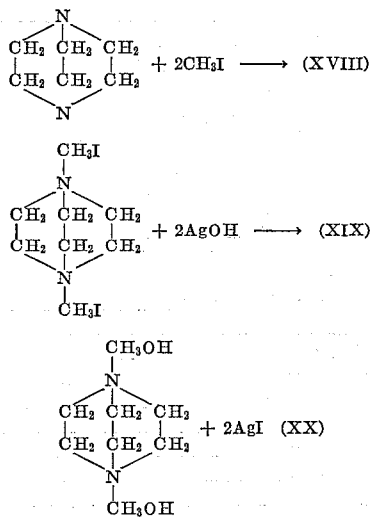

In using the N,N'-dimethyltriethylene-diammonium hydroxide compound in the preparation of ZK-5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methyl ammonium ion is converted to hydrogen ion.

Among the naturally occurring crystalline aluminosilicates which can be employed for purposes of the invention are included levynite, dachiardite, erionite, faujasite, analcite, paulingite, noselite, ferriorite, heulandite, scolecite, stilbite, clinoptilolite, harmotome, phillipsite, brewsterite, flakite, datolite, and aluminosilicates represented as follows:

Chabazite, $Na_2O.Al_2O_3.4SiO_2.6H_2O$
Gmelinite, $Na_2O.Al_2O_3.4SiO_2.6H_2O$
Cancrinite, $3(Na_2O.Al_2O_3.2SiO_2).Na_2CO_3$
Leucite, $K_2O.Al_2O_3.4SiO_2$
Lazurite, $(Na,Ca)_8Al_6Si_6O_{24}.2(S,Cl,SO_4)$
Scapolite, $Na_4Al_3Si_9O_{24}.Cl$
Mesolite, $Na_2O.Al_2O_3.3SiO_2.2-3H_2O$
Ptilolite, $Na_2O.Al_2O_3.10SiO_2.4H_2O$
Mordenite, $Na_2O.Al_2O_3.10SiO_2.6.6H_2O$
Nepheline, $Na_2O.Al_2O_3.2SiO_2$
Natrolite, $Na_2O.Al_2O_3.3SiO_2.2H_2O$
Sodalite, $3(Na_2O.Al_2O_3.2SiO_2).2NaCl$ Other aluminosilicates which can be used are caustic treated clays.

Of the clay materials, montmorillonite and kaolin families are representative types which include the sub-bentonites, such as bentonite, and the kaolins commonly identified as Dixie, McNamee, Georgia and Florida clays in which the main mineral constituent is halloysite, kaolinite, dickite, nacrite, or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

$Na_2O$/clay (dry basis) _____ 1.0–6.6 to 1
$SiO_2$/clay (dry basis) _____ 0.01–3.7 to 1
$H_2O/Na_2O$ (mole ratio) _____ 35–180 to 1

As previously noted, the active aluminosilicates used for purposes of the invention are characterized as having at least 0.5 equivalent of an ion of positive valence per gram atom of aluminum as determined by base exchanging with other cations by recognized techniques. Aluminosilicate starting materials not possessing this characteristic, however, may be employed providing they are either pretreated or acquire this characteristic as a result of treatment with the fluid medium. As an example of pretreatment, argillaceous materials contacted with caustic or caustic-silica mixtures, as above-described, results in the formation of amorphous and/or crystalline aluminosilicates having at least 0.5 equivalent, usually about 1.0 equivalent, of cation per gram atom of aluminum.

As has heretofore been pointed out, the novel compositions of this invention are aluminosilicates containing from 0.5 to 1.0 equivalent per gram atom of aluminum of ions of positive valence, said ions being from 0.01 to 0.99 equivalent per gram atom of aluminum of hydrogen ion and from 0.99 to 0.01 equivalent per gram atom of aluminum of at least one cation of metals selected from Groups IB through VIII of the Periodic Table. Except for alkali metal cations which may be present as impurities to the extent of less than 0.25 equivalent per gram atom of aluminum, no cations of metals of Group IA of the Periodic Table are associated with the aluminosilicate.

Within the above limits of the novel aluminosilicates of this invention, it is preferred that there be no alkali metal associated with the aluminosilicates, since the presence of these metals tends to suppress or limit catalytic properties, the activity of which, as a general rule, decreases with increasing content of alkali metal cations. It is also preferred that the novel aluminosilicates have between 0.8 and 1.0, more preferably 1.0, equivalent per gram atom of aluminum of the ions of positive valence previously set forth.

Additionally, it is preferred that the metal cation or cations be present in an amount from 40–85% of the total equivalents of ions of positive valence contained in the novel aluminosilicates of the instant invention. More preferably, the metal cation or cations should be present in an amount from 50–75% with from 75–85% being particularly preferred.

Therefore, the most preferred embodiment of this invention is an aluminosilicate containing 1 equivalent of ions of positive valence, said ions consisting of hydrogen ions and from 0.75 to 0.85 equivalent of cations of at least one rare earth metal.

The catalysts of this invention may be used in powdered, granular or molded state formed into spheres or pellets of finely divided particles having a particle size of 2 to 500 mesh. In cases where the catalyst is molded, such as by extrusion, the aluminosilicate may be extruded before drying, or dried or partially dried and then extruded. The catalyst product is then preferably precalcined in an inert atmosphere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

It has been further found in accordance with the invention that catalyst of improved activity and having other beneficial properties in the conversion of hydrocarbons are obtained by subjecting the treated aluminosilicate to a mild steam treatment carried out at elevated temperatures of 800° F. to 1500° F., and preferably at temperatures of about 100° F. to 1300° F. The treatment may be accomplished in an atmosphere of 100 percent steam or in an atmosphere consisting of steam and a gas which is substantially inert to the aluminosilicate. The steam treatment apparently provides beneficial properties in the aluminosilicate.

The high catalytic activities obtained by aluminosilicate compositions prepared in accordance with the invention are illustrated in connection with the cracking of a representative hydrocarbon charge. In the examples hereinafter set forth, the reference catalyst employed consisted of a conventional silica-alumina "bead" type cracking catalyst. The silica-alumina catalyst contained about 10 weight percent $Al_2O_3$ and the remainder $SiO_2$. In some instances it also contained a trace amount of $Cr_2O_3$, i.e., about 0.15 weight percent.

The cracking activity of the catalyst is further illustrated by its ability to catalyze the conversion of a Mid-Continent gas oil having a boiling range of 450–950° F. to gasoline having an end point of 410° F. Vapors of the gas oil are passed through the catalyst at temperatures of 875° F. or 900° F. substantially at atmospheric pressure at a feed rate of 1.5 to 16.0 volumes of liquid oil per volume of catalyst per hour for ten minutes. The method of measuring the instant catalyst was to compare the various product yields obtained with such catalyst with yields of the same products given by conventional silica-alumina catalyst at the same conversion level. The differences (Δ values) shown hereinafter represent the yields given by the present catalyst minus yields given by the conventional catalyst. In these tests the catalyst composition of the invention was precalcined at about 1000° F. prior to their evaluation as a cracking catalyst.

The catalysts prepared in accordance with the invention find extensive utility in wide variety of hydrocarbon conversion processes including the dehydrogenation of dehydrogenatable organic compounds, the dehydrocyclization of paraffin hydrocarbons having six or more carbon atoms, the desulfurization of sulfur-bearing hydrocarbon fractions, the oxidation of organic compounds, the hydrogenation of organic compounds, the dehydration of alcohols, alkylation of aromatic or isoparaffinic hydrocarbons with olefinic hydrocarbons, alcohols, esters, etc., and polymerization of unsaturated hydrocarbons to form higher boiling products, etc.

The following examples illustrate the best mode now contemplated for carrying out the invention.

*Example 1*

A synthetic crystalline aluminosilicate identified as Zeolite 13X was subjected to 12 two-hour treatments at 180° F. with an aqueous solution containing 5% by weight mixture of rare earth chlorides and 2% by weight of ammonium chloride. The aluminosilicate was then washed with water until there were no chloride ions in the effluent, dried, and then treated for 20 hours at 1225° F. with 100% atmospheric steam to yield a catalyst having a sodium content of 0.31 weight percent.

The following table shows the cracking data obtained when the catalyst was evaluated for cracking gas oil at 900° F.

TABLE 1

Cracking data:
    Conversion, vol. percent _____ 60.9
    LHSV _____ 16
    10 R.V.P. gaso., vol. percent _____ 54.6
    Excess $C_4$'s, vol. percent _____ 9.5
    $C_5+$ gasoline, vol. percent _____ 51.7
    Total $C_4$'s, vol. percent _____ 12.5
    Dry gas, wt. percent _____ 5.6
    Coke, wt. percent _____ 2.3
    $H_2$, wt. percent _____ 0.02
Δ advantage:
    10 R.V.P., vol. percent _____ +9.3
    Excess $C_4$'s, vol. percent _____ −4.5
    $C_5+$ gasoline, vol. percent _____ +7.4
    Total $C_4$'s, vol. percent _____ −3.7
    Dry gas, wt. percent _____ −2.2
    Coke, wt. percent _____ −2.4

*Example 2*

The procedure of Example 1 was repeated with the exception that the crystalline aluminosilicate was subjected to a continuous treatment for 24 hours instead of 12 two-hour treatments. The following table shows the cracking data obtained when the catalyst was evaluated for cracking gas oil at 900° F.

TABLE 2

Cracking data:
    Conversion, vol. percent _____ 60.7
    LHSV _____ 16
    10 R.V.P. gaso. vol. percent _____ 51.7
    Excess $C_4$'s, vol. percent _____ 11.2
    $C^5+$ gasoline, vol. percent _____ 49.2
    Total $C_4$'s, vol. percent _____ 13.7
    Dry gas, wt. percent _____ 6.4
    Coke, wt. percent _____ 3.0
    $H_2$, wt. percent _____ 0.03
Δ advantage:
    10 R.V.P. gaso., vol. percent _____ +6.5
    Excess $C_4$'s, vol. percent _____ −2.8
    $C^5+$ gasoline, vol. percent _____ +6.2
    Total $C_4$'s, vol. percent _____ −2.5
    Dry gas, wt. percent _____ −1.3
    Coke, wt. percent _____ −1.7

*Example 3*

A crystalline aluminosilicate identified as Zeolite 13X was subjected to three 2-hour treatments with a 5% by weight aqueous solution of ammonium chloride and then treated for 48 hours with an aqueous solution consisting of 5% by weight mixture of rare earth chlorides and 2% by weight of ammonium chloride. The aluminosilicate was then washed with water until there were no chloride ions in the effluent, dried and then treated for 24 hours at 1200° F. with steam at 15 p.s.i.g. to yield a catalyst having a sodium content of 0.2 weight percent.

*Example 4*

A synthetic crystalline aluminosilicate identified as Zeolite 13X was treated for 72 continuous hours with an aqueous solution containing 10% by weight of ammonium chloride, 10% by weight of ammonium acetate, and 1% by weight of rare earth chlorides. The aluminosilicate was then washed with water until there were no chloride or acetate ions in the effluent, dried and then treated for 24 hours at 1200° F. with steam at a pressure of 15 p.s.i.g.

The following table shows the cracking data obtained when the catalyst was evaluated for cracking gas oil at 900° F.

TABLE 3

Cracking data:
- Conversion, vol. percent _____ 56.6
- LHSV _____ 16.0
- 10 R.V.P. gaso., vol. percent _____ 50.9
- Excess $C_4$'s, vol. percent _____ 9.2
- $C_5+$ gasoline, vol. percent _____ 48.3
- Total $C_4$'s, vol. percent _____ 11.8
- Dry gas, wt. percent _____ 5.4
- Coke, wt. percent _____ 1.4
- $H_2$, wt. percent _____ 0.01

Δ advantage:
- 10 R.V.P. gaso., vol. percent _____ +7.9
- Excess $C_4$'s, vol. percent _____ −3.4
- $C_5+$ gasoline, vol. percent _____ +7.4
- Total $C_4$'s, vol. percent _____ −3.0
- Dry gas, wt. percent _____ −1.6
- Coke, wt. percent _____ −2.5

*Example 5*

A synthetic crystalline aluminosilicate identified as Zeolite 13X was subjected to 24 two-hour treatments with an aqueous solution consisting of 5% by weight of lanthanum chloride and 2% by weight of ammonium chloride at 180° F. The aluminosilicate was then washed with water until there were no chloride ions in the effluent, dried and then treated for 20 hours at 1225° F. with 100% atmospheric steam to yield a catalyst having a sodium content of 0.36 weight percent.

The following table shows the cracking data obtained when the catalyst was evaluated for cracking gas oil at 900° F.

TABLE 4

Cracking data:
- Conversion, vol. percent _____ 63.1
- LHSV _____ 16
- 10 R.V.P. gaso., vol. percent _____ 52.6
- Excess $C_4$'s, vol. percent _____ 12.3
- $C_5+$ gasoline, vol. percent _____ 50.4
- Total $C_4$'s, vol. percent _____ 14.5
- Dry gas, wt. percent _____ 6.8
- Coke, wt. percent _____ 3.6
- $H_2$, wt. percent _____ 0.04

Δ advantage:
- 10 R.V.P., vol. percent _____ +6.2
- Excess $C_4$'s, vol. percent _____ −2.7
- $C_5+$ gasoline, vol. percent _____ +6.2
- Total $C_4$'s, vol. percent _____ −2.5
- Dry gas, wt. percent _____ −1.4
- Coke, wt. percent _____ −1.5

*Example 6*

The procedure of Example 5 was repeated with the exception that the aluminosilicate was steamed for 24 hours at 1200° F. with steam at 15 p.s.i.g. The cracking data obtained when using this catalyst for cracking gas oil at 900° F. is shown in the following table.

TABLE 5

Cracking data:
- Conversion, vol. percent _____ 65.9
- LHSV _____ 16
- 10 R.V.P. gaso., vol. percent _____ 56.5
- Excess $C_4$'s, vol. percent _____ 12.1
- $C_5+$ gasoline, vol. percent _____ 53.9
- Total $C_4$'s, vol. percent _____ 14.7
- Dry gas, wt. percent _____ 6.6
- Coke, wt. percent _____ 3.0
- $H_2$, wt. percent _____ 0.03

Δ advantage:
- 10 R.V.P., vol. percent _____ +8.8
- Excess $C_4$'s, vol. percent _____ −3.9
- $C_5+$ gasoline, vol. percent _____ +8.4
- Total $C_4$'s, vol. percent _____ −3.3
- Dry gas, wt. percent _____ −2.1
- Coke, wt. percent _____ −2.7

*Example 7*

The procedure of Example 6 was repeated with the exception that 36 two-hour contacts of the lanthanum chloride and ammonium chloride solution were employed instead of 24 two-hour contacts. The resulting catalyst had a sodium content of 0.46 weight percent. Table 6 shows the cracking data obtained when the catalyst was evaluated for cracking gas oil at 900° F.

TABLE 6

Cracking data:
- Conversion, vol. percent _____ 63.7
- LHSV _____ 16
- 10 R.V.P. gaso., vol. percent _____ 55.3
- Excess $C_4$'s, vol. percent _____ 8.1
- $C_5+$ gasoline, vol. percent _____ 51.8
- Total $C_4$'s, vol. percent _____ 11.6
- Dry gas, wt. percent _____ 7.6
- Coke, wt. percent _____ 3.1
- $H_2$, wt. percent _____ 0.03

Δ advantage:
- 10 R.V.P., vol. percent _____ +8.7
- Excess $C_4$'s, vol. percent _____ −7.0
- $C_5+$ gasoline, vol. percent _____ +7.3
- Total $C_4$'s, vol. percent _____ −5.7
- Dry gas, wt. percent _____ −0.7
- Coke, wt. percent _____ −2.2

*Example 8*

A synthetic crystalline aluminosilicate identified as Zeolite 13X was treated with an aqueous solution containing 2% by weight mixture of rare earth chlorides for 18 continuous hours and then treated with an aqueous solution of ammonium sulfate containing 5% by weight of ammonium sulfate for 3 contacts of 16 hours each and then with 9 contacts of 2 hours each of the same solution. The treated aluminosilicate was washed with water until the effluent contained no chloride or sulfate ions, dried and then treated for 30 hours at 1200° F. with steam at 15 p.s.i.g. The resulting catalyst contained 0.12 weight percent sodium. The catalytic evaluation of the aluminosilicate for cracking gas oil at 900° F. is shown in the following table.

TABLE 7

Cracking data:
- Conversion, vol. percent _____ 37.5
- LHSV _____ 4
- 10 R.V.P. gaso., vol. percent _____ 32.5
- Excess $C_4$'s, vol. percent _____ 6.5
- $C_5+$ gasoline, vol. percent _____ 30.9
- Total $C_4$'s, vol. percent _____ 8.1
- Dry gas, wt. percent _____ 4.1
- Coke, wt. percent _____ 1.4
- $H_2$, wt. percent _____ 0.02

Δ advantage:
- 10 R.V.P., vol. percent _____ +0.1
- Excess $C_4$'s, vol. percent _____ −0.5
- $C_5+$ gasoline, vol. percent _____ +0.9
- Total $C_4$'s, vol. percent _____ −1.4
- Dry gas, wt. percent _____ +0.1
- Coke, wt. percent _____ −0.2

*Example 9*

A synthetic crystalline aluminosilicate identified as Zeolite 13Y was treated with an aqueous solution consisting of 5% by weight mixture of rare earth chlorides and 2% by weight of ammonium chloride and then washed with water until the effluent contained no chloride ions, dried and then treated for 24 hours at 1200° F. with 15 p.s.i.g. steam. The resulting aluminosilicate contained 0.52 weight percent sodium and gave the following results when tested for cracking gas oil at 900° F.

TABLE 8

Cracking data:

| | |
|---|---|
| Conversion, vol. percent | 61.6 |
| LHSV | 16 |
| 10 R.V.P. gaso., vol. percent | 54.9 |
| Excess $C_4$'s, vol. percent | 9.8 |
| $C_5+$ gasoline, vol. percent | 52.1 |
| Total $C_4$'s, vol. percent | 12.5 |
| Dry gas, wt. percent | 6.1 |
| Coke, wt. percent | 1.9 |
| $H_2$, wt. percent | 0.02 |

Δ advantage:

| | |
|---|---|
| 10 R.V.P., vol. percent | +9.0 |
| Excess $C_4$'s, vol. percent | −4.6 |
| $C_5+$ gasoline, vol. percent | +8.6 |
| Total $C_4$'s, vol. percent | −4.1 |
| Dry gas, wt. percent | −1.8 |
| Coke, wt. percent | −2.9 |

*Example 10*

The procedure of Example 9 was repeated with the exception that the solution consisted of 5% by weight of calcium chloride and 2% by weight of ammonium chloride. The catalytic evaluation for cracking gas oil at 900° F. is shown in the following table.

TABLE 9

Cracking data:

| | |
|---|---|
| Conversion, vol. percent | 61.8 |
| LHSV | 10 |
| 10 R.V.P. gaso., vol. percent | 57.0 |
| Excess $C_4$'s, vol. percent | 9.5 |
| $C_5+$ gasoline, vol. percent | 54.0 |
| Total $C_4$'s, vol. percent | 12.5 |
| Dry gas, wt. percent | 4.8 |
| Coke, wt. percent | 1.5 |
| $H_2$, wt. percent | 0.01 |

Δ advantage:

| | |
|---|---|
| 10 R.V.P., vol. percent | +11.2 |
| Excess $C_4$'s, vol. percent | −4.9 |
| $C_5+$ gasoline, vol. percent | +10.4 |
| Total $C_4$'s, vol. percent | −4.1 |
| Dry gas, wt. percent | −3.2 |
| Coke, wt. percent | −3.3 |

*Example 11*

The procedure of Example 9 was repeated with the exception that the treatment solution consisted of 5% by weight of lanthanum chloride and 2% by weight of ammonium chloride. The catalytic evaluation for cracking gas oil at 900° F. is shown in the following table:

TABLE 10

Cracking data:

| | |
|---|---|
| Conversion, vol. percent | 66.1 |
| LHSV | 16 |
| 10 R.V.P. gaso., vol. percent | 59.0 |
| Excess $C_4$'s, vol. percent | 9.3 |
| $C_5+$ gasoline, vol. percent | 55.7 |
| Total $C_4$'s, vol. percent | 12.6 |
| Dry gas, wt. percent | 7.0 |
| Coke, wt. percent | 2.3 |
| $H_2$, wt. percent | 0.02 |

Δ advantage:

| | |
|---|---|
| 10 R.V.P., vol. percent | +11.2 |
| Excess $C_4$'s, vol. percent | −6.9 |
| $C_5+$ gasoline, vol. percent | +10.1 |
| Total $C_4$'s, vol. percent | −5.7 |
| Dry gas, wt. percent | −1.7 |
| Coke, wt. percent | −3.4 |

*Example 12*

A synthetic crystalline aluminosilicate was prepared by mixing the following solutions:

(A) Sodium silicate solution:

| | |
|---|---|
| N-Brand sodium silicate [1] | 77.5 lbs. |
| NaOH pellets | 11.0 lbs. |
| Water | 143.0 lbs. |
| Specific gravity | 1.172 at 68° F. |

(B) Sodium aluminate solution:

| | |
|---|---|
| Sodium aluminate | 25.6 lbs. |
| Sodium hydroxide pellets | 11.0 lbs. |
| Water | 195.0 lbs. |
| Specific gravity | 1.140 at 68° F. |

[1] 8.8 weight percent $Na_2O$, 28.5 weight percent $SiO_2$, 62.7 weight percent water.

Solution (B) was added to solution (A) while agitating vigorously to break up the hydrogel as it formed into a creamy slurry. The slurry was heated for 12 hours at 205° F., filtered, washed to 11 pH and then dried in air at 280° F. to yield a crystalline aluminosilicate.

3.3 pounds of the aluminosilicate was treated with 4 batches of a 27.5% by weight aqueous solution of calcium chloride, each bath having 1 lb. of calcium chloride per pound of aluminosilicate. Three treatments were for 24 hours each at 180° F. and the fourth one was for 72 hours at room temperature. After the four treatments with the calcium chloride solution, the aluminosilicate was further treated four times with an aqueous solution containing 2% by weight of calcium chloride and 1% by weight of aluminum chloride for 4 contacts, 3 of which were for 2 hours and 1 was overnight, all 4 contacts being at room temperature. The aluminosilicate was then washed with water until the effluent contained no chloride ions, dried, pelleted to ½″ size, ground to 4/10 mesh and calcined for 10 hours in air at 1000° F. The aluminosilicate catalyst was then treated with 100% steam at 1225° F. for 20 hours at atmospheric pressure. The resulting catalyst was evaluated for cracking gas oil at 875° F. and gave the following results.

TABLE 11

Cracking data:

| | |
|---|---|
| Conversion, vol. percent | 64.3 |
| LHSV | 7.5 |
| $C_5+$ gaso., vol. percent | 53.5 |
| Total $C_4$'s, vol. percent | 12.7 |
| Total dry gas, wt. percent | 5.0 |
| Coke, wt. percent | 4.6 |

Δ advantage:

| | |
|---|---|
| $C_5+$ gaso., vol. percent | +11.8 |
| Total $C_4$'s, vol. percent | −8.4 |
| Total dry gas, wt. percent | −3.6 |
| Coke, wt. percent | −1.0 |

*Example 13*

A synthetic crystalline aluminosilicate identified as Zeolite 4A was treated three times for 24 hours and one time for 72 hours with a 26 weight percent aqueous solution of calcium chloride at 180° F. After the treatment with calcium chloride, the aluminosilicate was then treated for three two-hour contacts and one overnight contact at room temperature with an aqueous solution consisting of 2% by weight of calcium chloride and 1% by weight ammonium chloride. The aluminosilicate was then washed with water until the effluent contained no chloride ions, dried, calcined for 10 hours at 1000° F. in air, and then treated with steam for 20 hours at 1225° F. to yield a catalyst having a sodium content of 0.6 percent by weight.

*Example 14*

A synthetic crystalline aluminosilicate identified as Zeolite 5A was treated with a chloroplatinic acid solution containing 2.0 grams platinum and an ammonium hydroxide solution containing 28% by weight ammonia. The aluminosilicate was washed with water until the effluent contained no chloride ions, dried and then treated for 20 hours at 1225° F. with atmospheric steam to yield an aluminosilicate having excellent catalytic properties.

*Example 15*

1800 grams of a crystalline aluminosilicate identified as Zeolite 13X was treated with a solution consisting of cerium chloride and ammonium hydroxide. The treatment was carried out at a temperature of 160–180° F. for ½ hour after which time the slurry was filtered and then the operation repeated for another ½ hour. The resulting aluminosilicate contained 0.81 weight percent sodium and 24.7 weight percent cerium.

*Example 16*

66.5 grams of a synthetic crystalline aluminosilicate identified as Zeolite 5A was pelleted and treated with 26.6 grams of ammonium nitrate dissolved in 1 gallon of distilled water. The product was rinsed with distilled water until the effluent contained no nitrate ions and then calcined at 650–700° F. for several hours in a stream of nitrogen. The resulting aluminosilicate analyzed at 9.08 weight percent calcium.

*Example 17*

A natural crystalline aluminosilicate identified as gmelinite was crushed to a particle size of less than 32 mesh and calcined in air for 1 2hours at 650° F. 5 grams of the calcined crushed gmelinite was treated 10 times with 10 cc. of a solution containing 4% by weight mixture of rare earth chlorides and 1% by weight ammonium chloride. Each of the treatments was for 1 hour at a temperature of 173–186° F. The aluminosilicate was then washed with water until the effluent contained no chloride ions, dried overnight at 190° F., pelleted, recrushed to a particle size of less than 12 mesh and calcined for three hours at 900° F. in air. The resulting product was employed as a catalyst for the cracking of decane at a catalyst concentration of 3.3 cc. at a feed rate of 3.0 LHSV, and temperature of 900° F. A conversion of 91.6% by weight was obtained.

*Example 18*

The procedure of Example 17 was repeated with the exception that Ptilolite was employed instead of gmelinite. When the resulting catalyst was used to crack decane, it gave a conversion of 58.7% by weight.

*Example 19*

The procedure of Example 17 was repeated with the exception that the aluminosilicate employed was identified as chabazite. The resulting catalyst gave a conversion of 95% by weight when employed to crack decane.

*Example 20*

A synthetic crystalline aluminosilicate, identified as Zeolite 13X, was subjected to 12 two-hour treatments at 180° F. with an aqueous solution containing 5% by weight mixture of rare earth chlorides and 2% by weight of ammonium chloride. The aluminosilicate was then treated with a 10% by weight aqueous solution of ammonium carbonate for 4 hours at 180° F. The resulting modified aluminosilicate was then washed with water until there were no chloride or carbonate ions in the effluent, dried and then treated for 24 hours at 1200° F. with steam at 15 p.s.i.g. to yield a catalyst having a sodium content of 0.65 weight percent.

The following table shows the cracking data obtained when the catalyst was evaluated for cracking gas oil at 900° F.

TABLE 12

Cracking data:
| | |
|---|---|
| Conversion, vol. percent | 43.4 |
| LHSV | 8 |
| 10 R.V.P. gaso., vol percent | 40.9 |
| Excess $C_4$'s, vol. percent | 5.8 |
| $C_5$+gasoline, vol. percent | 38.6 |
| Total $C_4$'s, vol. percent | 8.2 |
| Dry gas, wt. percent | 3.6 |
| Coke, wt. percent | 0.9 |
| $H_2$, wt. percent | 0.02 |

Δ advantage:
| | |
|---|---|
| 10 R.V.P., vol. percent | +5.1 |
| Excess $C_4$'s, vol. percent | −2.9 |
| $C_5$+gasoline, vol. percent | +5.1 |
| Total $C_4$'s vol. percent | −2.8 |
| Dry gas, wt. percent | −1.3 |
| Coke, wt. percent | −1.12 |

*Example 21*

The procedure of Example 20 was repeated with the exception that a 10% by weight aqueous solution of ammonium phosphate was employed instead of the ammonium carbonate. The resulting catalyst had a sodium content of 0.5 weight percent and the cracking data shown in the following table when used at 900° F.

TABLE 13

Cracking data:
| | |
|---|---|
| Conversion, vol. percent | 42.2 |
| LHSV | 16 |
| 10 R.V.P., gaso., vol. percent | 35.1 |
| Excess $C_4$'s, vol. percent | 7.7 |
| $C_5$+gasoline, vol. percent | 33.5 |
| Total $C_4$'s, vol. percent | 9.3 |
| Dry gas, wt. percent | 4.7 |
| Coke, wt. percent | 2.1 |
| $H_2$, wt. percent | 0.02 |

The following examples illustrate the use of clays which have been treated with caustic in admixture with a source of silica, such as sand, silica gel or sodium silicate, calcined at temperatures ranging from 350° F. to 1600° F., crushed, dispersed in water and digested.

*Example 22*

McNamee clay,[1] an aluminosilicate which had been caustic treated, was subjected to treatment with an aqueous solution consisting of 5% by weight mixture of rare earth chlorides and 2% by weight ammonium chloride. The aluminosilicate was then washed with water until the effluent contained no chloride ions and treated for 20 hours at 1225° F. with steam at atmospheric pressure. The resulting aluminosilicate was evaluated for cracking gas oil at 900° F. and gave the following results.

TABLE 14

Cracking data:
| | |
|---|---|
| Conversion, vol. percent | 57.2 |
| LHSV | 16 |
| 10 R.V.P. gaso., vol. percent | 49.9 |
| Excess $C_4$'s, vol. percent | 9.5 |
| $C_5$+gasoline, vol. percent | 47.4 |
| Total $C_4$'s, vol. percent | 12.0 |
| Dry gas, wt. percent | 5.6 |
| Coke, wt. percent | 2.8 |
| $H_2$, wt. percent | 0.05 |

[1] $Al_2O_3$—39.85 wt. percent, $SiO_2$—44.9 wt. percent, $Fe_2O_3$—0.35 wt. percent, $TiO_2$—0.73 wt. percent, CaO—trace, MgO—trace, $Na_2O$—0.12 wt. percent, $K_2O$—0.10 wt. percent.

Δ advantage:
    10 R.V.P., vol. percent _____ +6.5
    Excess C₄'s, vol. percent _____ −3.2
    C₅+gasoline, vol. percent _____ +6.2
    Total C₄'s, vol. percent _____ −3.0
    Dry gas, wt. percent _____ −1.16
    Coke, wt. percent _____ −1.2

*Example 23*

Dixie Clay,[2] an aluminosilicate which had been caustic treated, was treated with an aqueous solution consisting of 5% by weight mixture of rare earth chlorides and 2% by weight of ammonium chloride for 2 treatments of 24 hours each. The aluminosilicate was then washed with water until the effluent contained no chloride ions, dried and treated with steam for 20 hours at 1225° F. at atmospheric pressure.

The catalytic evaluation of the resulting aluminosilicate for cracking gas oil at 900° F. is shown in the following table:

TABLE 15

Cracking data:
    Conversion, vol. percent _____ 36.9
    LHSV _____ 10
    10 R.V.P. gaso., vol. percent _____ 36.2
    Excess C₄'s, vol. percent _____ 2.0
    C₅+gasoline, vol. percent _____ 33.7
    Total C₄'s, vol. percent _____ 4.5
    Dry gas, wt. percent _____ 3.5
    Coke, wt. percent _____ 1.8
    H₂, wt. percent _____ 0.15

Δ advantage:
    10 R.V.P., vol. percent _____ +4.2
    Excess C₄'s, vol. percent _____ −5.0
    C₅+gasoline, vol. percent _____ +4.0
    Total C₄'s, vol. percent _____ −4.8
    Dry gas, wt. percent _____ −0.5
    Coke, wt. percent _____ +0.3

*Example 24*

Bentonite, an aluminosilicate, which had been caustic treated, was treated with an aqueous solution consisting of 5% by weight mixture of rare earth chlorides and 2% by weight of ammonium chloride. The treated aluminosilicate was then washed with water until there was no chloride ions in the effluent, dried and then treated with steam for 24 hours at 1200° F. at a pressure of 15 p.s.i.g. The resulting aluminosilicate contained 0.2% by weight calcium sodium and possessed excellent catalytic properties.

This application is a continuation-in-part of application Serial No. 754,915, filed August 14, 1958.

What is claimed is:

1. In the catalytic cracking of a hydrocarbon oil to produce hydrocarbons of lower boiling range, the improvement of contacting said oil under cracking conditions with a crystalline aluminosilicate having an ordered crystalline structure having from 0.5 to 1.0 equivalent per gram atom of aluminum of ions of positive valence of which no more than 0.25 equivalent are alkali metal cations and having associated with said crystalline aluminosilicate both hydrogen ions and ions capable of conversion to hydrogen ions and cations of metals selected from Group IB through Group VIII of the Periodic Table, said metal cations, hydrogen ions and ions capable of conversion to hydrogen ions being associated with the aluminosilicate as a result of base exchange.

2. The process of claim 1 wherein the hydrogen ions and ions capable of conversion to hydrogen ions are associated with the crystalline aluminosilicate in amounts ranging from 0.01 to 0.99 equivalent per gram atom of aluminum and the cations of metals selected from Group IB through Group VIII of the Periodic Table are associated with the aluminosilicate in amounts ranging from 0.99 to 0.01 equivalent per gram atom of aluminum.

3. The process of claim 2 wherein the metal cation is calcium.

4. In the catalytic cracking of a hydrocarbon oil to produce hydrocarbons of lower boiling range the improvement of contacting said oil under cracking conditions with a crystalline aluminosilicate having an ordered crystalline structure having from 0.5 to 1.0 equivalent per gram atom of aluminum of ions of positive valence of which no more than 0.25 equivalent are alkali metal cations and having associated with said crystalline aluminosilicate both ammonium ions and cations of metals selected from Group IB through Group VIII of the Periodic Table, said metal cations and ammonium ions being associated with the aluminosilicate as a result of base exchange.

5. The process of claim 4 wherein the ammonium ion is associated with the crystalline aluminosilicate in an amount ranging from 0.99 to 0.01 equivalent per gram atom of aluminum and the cations of metals selected from Group IB through Group VIII of the Periodic Table are associated with the crystalline aluminosilicate in amounts ranging from 0.01 to 0.99 equivalent per gram atom of aluminum.

6. The process of claim 5 wherein the metal cation is calcium.

7. In the catalytic cracking of a hydrocarbon oil to produce hydrocarbons of a lower boiling range the improvement of contacting said oil under cracking conditions with a faujasite having from 0.5 to 1.0 equivalents per gram atom of aluminum of ions of positive valence of which no more than 0.25 equivalent are alkali metal cations and having associated with said faujasite both hydrogen ions and ions capable of conversion to hydrogen ions and cations of metals selected from Group IB through Group VIII of the Periodic Table, said metal cations, hydrogen ions and ions capable of conversion to hydrogen ions being associated with the aluminosilicate as a result of base exchange.

8. In the catalytic cracking of a hydrocarbon oil to produce hydrocarbons of lower boiling range, the improvement of contacting said oil under cracking conditions with a crystalline aluminosilicate having an ordered crystalline structure having from 0.8 to 1.0 equivalent per gram atom of aluminum of ions of positive valence of which no more than 0.25 equivalent are alkali metal cations and having associated with said crystalline aluminosilicate both hydrogen ions and ions capable of conversion to hydrogen ions and cations of metals selected from Group IB through Group VIII of the Periodic Table, said metal cations, hydrogen ions and ions capable of conversion to hydrogen ions being associated with the aluminosilicate as a result of base exchange.

9. The process of claim 8 wherein the metal cations are 40 to 85 percent of the total equivalents of ions of positive valence associated with the crystalline aluminosilicate.

References Cited in the file of this patent

UNITED STATES PATENTS

| | | |
|---|---|---|
| 2,971,903 | Kimberlin et al. | Feb. 14, 1961 |
| 2,971,904 | Gladrow et al. | Feb. 14, 1961 |
| 3,130,006 | Rabo et al. | Apr. 21, 1964 |

---

[2] 44.51 wt. percent Al₂O₃, 38.51 wt. percent SiO₂, 1.27 wt. percent Fe₂O₃, 1.47 wt. percent TiO₂, 0.08 wt. percent CaO, 0.12 wt. percent MgO, 0.08 wt. percent Na₂O.